(12) United States Patent
Abbate

(10) Patent No.: US 7,665,642 B2
(45) Date of Patent: Feb. 23, 2010

(54) PORTABLE ACTIVITY CASE WITH FOLD-OUT TABLE

(76) Inventor: Richard Abbate, 97 King Charles Dr., Portsmouth, RI (US) 02871

( * ) Notice: Subject to any disclaimer, the term of this patent is extended or adjusted under 35 U.S.C. 154(b) by 987 days.

(21) Appl. No.: 11/286,215

(22) Filed: Nov. 23, 2005

(65) Prior Publication Data

US 2006/0144884 A1 Jul. 6, 2006

Related U.S. Application Data

(60) Provisional application No. 60/631,554, filed on Nov. 29, 2004.

(51) Int. Cl.
*A45C 15/00* (2006.01)
*A45F 4/02* (2006.01)
(52) U.S. Cl. ............... 224/585; 224/153; 224/579; 224/275
(58) Field of Classification Search .......... 224/275, 224/153, 155, 585, 579, 580, 543, 560, 564, 224/565, 906, 607; 296/37.16; 297/188.04–188.07, 297/188.2, 188.21; 108/38
See application file for complete search history.

(56) References Cited

U.S. PATENT DOCUMENTS

| | | | | | |
|---|---|---|---|---|---|
| 4,313,385 | A * | 2/1982 | Fitzgerald | .................... | 108/38 |
| 4,383,626 | A * | 5/1983 | Weinblatt | ................... | 224/275 |
| 5,411,192 | A * | 5/1995 | Xiao | .......................... | 224/153 |
| 5,694,860 | A * | 12/1997 | Xiao | .......................... | 108/38 |
| 6,216,927 | B1 * | 4/2001 | Meritt | ........................ | 224/275 |
| 7,301,757 | B2 * | 11/2007 | Lee et al. | .............. | 361/679.27 |
| 2005/0072824 | A1 * | 4/2005 | Lee et al. | .................... | 224/585 |
| 2006/0243766 | A1 * | 11/2006 | Lan | ............................ | 224/275 |

* cited by examiner

Primary Examiner—Nathan J Newhouse
Assistant Examiner—Corey N Skurdal
(74) Attorney, Agent, or Firm—Donald W. Meeker

(57) ABSTRACT

A portable activity case for use in an automobile has an attachment mechanism that secures the activity case to most automobile seatbacks. The case is provided with an ergonomic fold-out table with a support that extends over the child's lap. The table also has two legs which extend down to provide support for the activity table to make the case self-standing for use on any flat surface. The case is large enough to contain coloring books, notebooks, and related writing supplies while maintaining a lightweight, yet strong and safe case structure.

17 Claims, 6 Drawing Sheets

PORTABLE ACTIVITY CASE WITH FOLD-OUT TABLE

CROSS-REFERENCE TO RELATED APPLICATIONS

This application claims the benefit of U.S. Provisional Patent Application No. 60/631,554, filed on Nov. 29, 2004.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to vehicle supported planar surfaces and particularly to a portable activity case which can be easily transported from the home and used in the automobile, via an attachment mechanism that secures the case to most automobile seatbacks, said case is large enough to contain 8.5"×11" size books (i.e., coloring and notebooks for example) with related writing supplies (i.e., crayons, markers, colored pencils) while maintaining a lightweight, yet strong and safe case structure, the case being further provided with a fold-out table feature that extends over the child's lap, providing adequate ergonomic interaction and hours of safe, enjoyable play, and further provided with two legs which extend down to provide support for the activity table to make the case self-standing for use on any flat surface outside of the vehicle.

2. Description of Related Art Including Information Disclosed Under 37 CFR 1.97 and 1.98

As most parents know, the problems of keeping peace within a family group in a confined space can be particularly trying when family groups are traveling in automobiles. When a child is securely fastened within a child safety seat (for younger children) or restrained by shoulder and lap restraints has made it difficult to provide a child with the opportunity to entertain his or herself during long automotive trips.

Many parents have looked for activities to occupy their children within a vehicle to make long distance travel more peaceful. Parents typically bring numerous books, drawing supplies, and small toys for the children to play with in the vehicle. There are at least three major problems with loose activity materials in a vehicle which are not adequately addressed by the prior art: transporting the materials in a convenient and orderly fashion, storing the materials for convenient access and use in the vehicle, and providing an ergonomic surface on which to use the materials.

Prior art U.S. Pat. No. 5,878,672, issued Mar. 9, 1999 to Ostermann, discloses a portable organizer desk for use while traveling. The portable organizer desk comprises a sheet of a substantially planar flexible material, a pair of elongate handle straps attached to the sheet on a first fold line defining a first panel and a second panel in the sheet, a pair of loops attached to the sheet along a second fold line defining a third panel, a pair of connecting straps attached to the sheet in the second panel, a plurality of pockets detachably connected to the sheet in the third panel, and a lapboard detachably connected to the connecting straps. The lapboard has an activity surface and an opposing padded surface. The pair of connecting straps permit the lapboard to be selectively moved between a first position against the second panel of the sheet and a second position extending outwardly therefrom. The lapboard is detachably secured in the first position.

Prior art U.S. Pat. No. 5,269,229, issued Dec. 14, 1993 to Akapatangkul, provides a retractable tray assembly, which is mounted at the rear surface of a vehicle seat and can be swung between a retracted upright position within a support frame and a generally horizontal service position extending outwardly from the frame. Tracks along side edges of the tray enable the tray to be slidably adjusted toward or away from a person seated behind the tray.

Prior art U.S. Pat. No. 5,984,347, issued Nov. 16, 1999 to Blanc-Rosset, describes an attaché case type accessory for motor vehicles or the like having at least two seats arranged one behind the other, the front seat having a headrest or the like. The accessory is adapted to be removably mounted to the back of the front seat so as to form a functional platform for a passenger sitting on the back seat. The attaché case accessory includes a casing, a rigid frame and a stabilizing means. The attaché case type accessory is rotatably mounted about a shaft so that it can be, in a non-use position, in a substantially vertical plane, and; in use position, in a substantially horizontal plane. The upper portion of the rigid frame is suspended by a suspending and height adjustment means to the vertical supports of the headrest of the front seat. The stabilizing means comprises a pair of arms that engage the back of the seat so as to adjust and maintain the accessory in its substantially horizontal and vertical planes respectively.

Prior art U.S. Pat. No. D419,520, issued Jan. 25, 2000 to Bergh, shows the ornamental design for a vehicle backseat organizer.

Prior art U.S. Pat. No. D153,348, issued Apr. 12, 1949 to Gainsbro, claims the ornamental design for a combined motor vehicle service cabinet and table.

Prior art U.S. Pat. No. 4,466,659, issued Aug. 21, 1984 to Carpentier, concerns a folding tray holder for attachment to the rear of a stadium seat. The device comprises hook like members on each side thereof which engage upright seat supports on each side of the seat and support the holder on the back of the seat. The holder has a rigid planar member in a bottom panel which may be folded upward from a supporting position when emptied to a stowed position to allow persons to pass along the aisle. The holder may be secured in the folded or stowed position and has a shoulder strap for carrying when removed from the seat back.

Prior art U.S. Patent Application No. 20030051640, published Mar. 20, 2003 by Roseler, describes a removable tray table assembly, which attaches to the back of a front seat in a motor vehicle. The tray table is comprised of a flat tray member inside a frame, a flat member attached to the tray member via a hinge and two straps. The flat member of the assembly is inserted into the seat back pocket of the front seat in a motor vehicle. The hinge allows the tray member to be deployed to its horizontal usable position. The straps are attached to the left and right edges of the tray member and secured to the headrest of the front seat. The straps hold the tray member in its usable horizontal position. The horizontal attitude of the tray member is adjusted relative to the tilt of the front seat via the buckling device by loosening or tightening the straps. To move the tray to its non-use position the straps are released from their respective buckling device located adjacent to the tray itself, the tray is lifted in an upright manner. To secure the tray in it's upright and locked position the straps that hold the tray in the horizontal position are buckled together across the bottom of the tray, thus securing the tray. The bottom of the tray is covered with upholstery to make any contact with the tray comfortable. The tray can be fitted with a cup holder for containing drink cups and boxes. The assembly can also have a netting device located along the top edge of the tray to contain materials (i.e. pencils, papers, crayons, etc.) when in its upright stowed position. The flat portion or the tray can be decorated as a game board (i.e. checkers, etc.). This is an ideal way for children to be able to contain foodstuffs and participate in writing, coloring and game activities while traveling in a motor vehicle.

Prior art U.S. Pat. No. 6,554,683, issued Aug. 23, 2001 to Hochfeld, discloses an amusement device for use in a traveling vehicle. The device includes a housing having a paper holding area defined by side walls and a bottom wall for receiving and holding a piece of paper therein, a transparent top wall in overlying relation to the paper holding area such that the piece of paper is viewable through the transparent wall, the transparent wall having an outer surface which can be written on and then erased, and a slot in one side wall for receiving the piece of paper into the paper holding area and for removing the piece of paper from the paper holding area; a mounting assembly for mounting the housing to a seat of the traveling vehicle so that the piece of paper is viewable by a person to the rear of the seat, the mounting assembly including two hook members connected with the housing for hanging the housing from the seat of the traveling vehicle; a plurality of light emitting diodes mounted in spaced relation to an inner surface of the transparent wall for providing an indication as to predefined points on the paper held in the paper holding area, the paper includes indicia thereon corresponding to the light emitting diodes; an actuation device for actuating selected ones of the light emitting diodes from a location remote from the housing; and a back light in the housing for illuminating a rear side of the piece of paper.

Prior art U.S. Pat. No. 5,813,354, issued Sep. 29, 1998 to Scott, indicates a vehicle seatback tray assembly that includes a main tray assembly; a two-sided, two-way pivoting mirror assembly; two user formable, upper attachment hooks; and two adjustable length lower securing strap assemblies. The main tray assembly includes a main housing, a pivoting tray member and a tray member angular adjustment mechanism. The main housing includes a forward storage tray, a main housing compartment, a light compartment for housing a light bulb socket, and a light bulb socket controlling on/off switch. The pivoting tray member is pivotally connected to the main housing and includes a light opening that pivots over the light compartment of the main housing when the pivoting tray member is pivoted into a closed position blocking. The angular adjustment mechanism includes a curved locking bar and a locking pin assembly. The two-sided, two-way pivoting mirror assembly is positioned within the main housing compartment and includes a two-sided mirror, a first and a second pivot bar, a first and a second pivoting strip connector, and first and second pull straps.

Prior art U.S. Pat. No. 5,722,586, issued Mar. 3, 1998 to Hansen, discloses a portable desk for hanging from the rear portion of a seat back. The desk includes a table board having substantially planer upper and lower surfaces, a top portion and a bottom portion. A pair of mounting brackets are provided with each such bracket having a mounting portion securable to the table board bottom surface and an attachment portion extending beyond the top portion of the table board. The attachment portion includes connection members for releasable attachment to the top of a seat back. Support members extend from the table board bottom surface for bracing the table board against the rear surface of a seat back to define the operational angle of the desk relative to the seat back. Finally, a support ledge is disposed along the upper table board surface at the bottom portion to provide a brace for materials placed on the table board upper surface during the use of the desk.

Prior art U.S. Pat. No. 5,511,493, issued Apr. 30, 1996 to Kanehl, Jr., concerns a vehicle mountable table for supporting objects within a vehicle. The inventive device includes a pair of mounting brackets securable to a door or seat of the associated vehicle. A table member is coupled to the mounting brackets by an adjustment assembly, which permits vertical movement of the tray relative to the brackets.

Prior art U.S. Pat. No. 5,443,018, issued Aug. 22, 1995 to Cromwell, illustrates a folding tray for attachment to a vehicle seat back, in which first box and a second box are connected to a base member. The base member may be attached to the back of a vehicle seat with a mounting harness. The second box and the first box can be moved to an open position, away from the seat back. The tops of the boxes can then be opened, or folded up to form an easel for holding a book. A handle is provided for using the invention apart from a vehicle.

Prior art U.S. Pat. No. 5,411,192, issued May. 2, 1995 to Xiao depicts a folding table disposed within a tote bag, which may be extended therefrom to rest on a surface or, alternatively, suspend from an automobile seat and the like. The table may be positioned at various angles relative to the supporting surface so as to maintain a level position and it includes both a drink holder and a book holder for securing a position of such articles upon the table. The apparatus further includes a pair of carrying straps configurable into either a backpack harness or a handbag strap and is also provided with a table cloth which may be unrolled therefrom for subsequent use.

Prior art U.S. Pat. No. 5,370,060, issued Dec. 6, 1994 to Wang, is for a multipurpose automobile foldaway table, which includes a table pivotably connected to a frame, two retractably bars respectively and retractably fastened to the frame, and lock screws respectively threaded into screw holes on the frame for locking the retractable bars at a desired elevation, each retractable bar having a top end terminated to a swivel hook for mounting on the head rest of a car seat, the table having recessed top compartments covered by a sliding cover for holding things, and collapsible stands at the bottom for supporting the foldaway table on the ground as it is dismantled from the car seat.

Prior art U.S. Pat. No. 5,046,433, issued Sep. 10, 1991 to Kramer, describes an adjustable folding table apparatus for attachment to a seat back for use primarily within an automobile or other vehicle. The table apparatus includes a tray portion rotatable between a substantially vertical stored position and a substantially horizontal extended position, suspended from a portion of the seat back and employing a series of flexible straps to enable both facilitated attachment and detachment of the apparatus from the seat back, as well as adjustment of the vertical and/or angular orientation of the tray apparatus. A latch or catch serves to retain the tray portion in a folded up or stored position until it is dislodged.

Prior art U.S. Pat. No. 4,770,107, issued Sep. 13, 1988 to Miller, indicates a portable and collapsible travel tray assembly for mounting in conjunction with a conventional automobile seat positioned to the front of the user of the tray and the seat of the user, particularly a child's car seat. The portable tray assembly comprises a rigid bottom panel member having front, back, and side portions. The bottom panel member is provided with a pair of opposing folding side panels, which extend along the side portions of the bottom panel and above the plane of the bottom panel when in the unfolded position.

The tray assembly also includes a front folding panel extending between the opposing side panels and along the front portion of the bottom panel and above the plane of said bottom panel. The folding side and front panels permit the tray to be converted from a stowed or collapsed position when the side and front panels are in the folded or stowed position to a position of use when in the unfolded position. The opposing side panels include flexible arm members, which extend beyond the front portion of the bottom panel and attach to front suspension means for supporting the front portion of the tray. A back suspension means is attached to the back portion of the bottom panel whereby the front and back suspension means co-act to hold the tray in level position. When so mounted the tray is particularly adapted to serve as a small travel tray for the reception of articles in a position where it is readily accessible to a child, for example, seated in a car seat.

Prior art U.S. Pat. No. 3,386,392, issued Jun. 4, 1968 to Gramm, discloses an adjustable tray apparatus for supporting a pet or articles in vertically and angularly variable positions relative to an automobile seat or the like. A parallel pair of horizontal supports are removably secured in vertically adjustably spaced engagement at their ends with a parallel pair of generally vertical support members adapted to hook over the back of the seat in either forward or rearward orientation. A tray base is pivotally removably mounted on either of the horizontal supports and is provided with a pair of slotted tracks for slidable receiving the corresponding ends of a pair of angular supports, the other ends of which are pivotally removably mounted on the other horizontal support. The tray base is provided with a removable pet cushion. The apparatus is laterally adjustable to accommodate differently contoured seats and is collapsible and disassemblable.

Prior art U.S. Pat. No. 2,932,544, issued Apr. 12, 1960 to Lambert, indicates a collapsible support device for vehicle. The device comprises a master frame, hanger means on one end of said master frame to overhang the upper edge of a seat back, a generally rectangular tray support frame hingedly connected to said master frame, a tray supported by said support frame, a pair of brace bars pivoted to and extending from opposite sides of the support frame, a collar hingedly connected to the lower end of each brace bar, each collar being longitudinally slidable on a respective portion of the master frame, and an abutment means extending laterally from each collar. A hook device is pivoted on the upper end of each of said respective portions of the master frame. Each hook has an extension means to be engaged on the corresponding collar. Each hook has stop means to engage the corresponding portion of the master frame to limit pivotal movement of the hook in one direction, whereby the collar cams its said hook out of its path momentarily when raised and quickly lowered to release the hook.

Prior art U.S. Pat. No. 2,921,824, issued Jan. 19, 1960 to Richter, puts forth a collapsible table-stand for use primarily inside of an automobile. The device comprises a rectangular table platform; a U-shaped platform tubing disposed around the front edge and both sides of the platform and having extension portions extending suitably beyond each side of the table; a swingable clamp journaled to each of the extension portions of the platform tubing; a U-shaped frame tubing disposed in said clamps' tubing with the clamps respectively secured to the respective ends of the frame tubing, the legs of the frame tubing having a plurality of spaced-apart locking apertures therein; telescopic linear tubular means hingedly secured at one end to the bottom wall of said table platform and hingedly secured at the other end to the base of the U-shaped frame member; a pair of C-shaped tubular hangers each having a suitably long arm of suitable diameter to insertion into the legs of the U-shaped frame member and having an aperture adjacent the end of the long arm and a single coil spring having a button therein disposed in each long arm of said hanger and through the aperture thereof, whereby the long arms of the hangers are slidably adjustable in the legs of the U-shaped frame member and locked thereto by engagement of said button through the apertures of the frame member.

Prior art U.S. Pat. No. 2,687,336, issued Aug. 24, 1954 to Smith, concerns a table for attachment to the back of an automobile seat. The table comprises a table top; a pair of laterally spaced supportive brackets beneath the table top, each including a depending rear arm; a pair of suspension hooks carried by said brackets and engageable over the seat back to suspend the brackets; and a pair of laterally spaced vertical pusher bars in the rear of said arms engageable with the seat back. Hinges connect the bars at upper ends thereof to said arms for vertical tilting of the arms for leveling the brackets to level the table top. Jack screws are threaded through the arms for turning against the bars to tilts the arms.

Prior art U.S. Patent Application No. 20010039903, published Nov. 15, 2001 by Patterson, shows a car seat travel tray apparatus for providing a work surface in an automobile. A first portion including a rigid member is hingedly coupled to a tray portion including a rigid member. Straps or other attachment mechanism is coupled to the first portion to allow the apparatus to be attached to an automobile seat back. The first portion is attached in a position adjacent to the seat back, and the tray portion is rotated downward in an arc to a desired orientation, most commonly substantially parallel to the ground. A retainer retains the tray portion in the desired orientation relative to the seat back. In one embodiment, a cord and cord-lock are used as the retainer. The cord and cord lock allow adjustment of the orientation of the tray portion through a continuum when the apparatus is installed. This permits the apparatus to accommodate a wide variety of seat backs having broadly varying angles. Pocketing of various types may be disposed in a volume between the first portion and the tray portion.

What is needed is a convenient and orderly way to transport loose activity materials, such as books, drawing supplies, and small toys for use in activities to occupy children within a vehicle to make long distance travel more peaceful, a way to store the materials for convenient access and use in the vehicle, an ergonomic surface on which to use the materials, and a means to stabilize the case and table against the back of the front seat of the vehicle.

BRIEF SUMMARY OF THE INVENTION

An object of the present invention is to provide a lightweight closable carrying case with carrying straps as a convenient and orderly way to transport loose activity materials, such as books, drawing supplies, and small toys for use in activities to occupy children within a vehicle to make long distance travel more peaceful, multiple separate easy to view and access compartments in the pack as a way to store the materials for convenient access and use in the vehicle, and apparatus for mounting the case on a back of a front seat of a vehicle with an easy to use comfortable fold down table as an ergonomic surface on which to use the materials by a child seat belted into the back seat, and a projecting rear triangulated stabilizing structure to stabilize the case against the back of a front seat of a vehicle.

Another object of the present invention is to provide a portable activity case with an ergonomic table having extendable table support legs which extend down to provide support for the activity table and allow the case to be self-standing for use on any flat horizontal surface outside of the vehicle.

A further object of the present invention is to provide a portable activity case manufactured from lightweight materials which while being durable, would cause less injury should a person come in contact with the activity case during a collision.

A contributory object of the present invention is to provide a portable activity case which can be adjusted to compensate for varying reclining angles of the front seat.

In brief, the present invention comprises a portable activity case which can be easily transported from the home, using a top handle, shoulder strap or backpack straps, and used in a vehicle, via an attachment mechanism that secures the case to most automobile seatbacks. The case is large enough to contain 8.5"×11" size books (i.e., coloring and notebooks for example) with related writing supplies (i.e., crayons, markers, colored pencils) while maintaining a lightweight, yet strong and safe case structure. The various activity tools can be attached to one or more boards which fit in the case and can secure to an inside surface using mating hook and loop fasteners. The case further comprises a fold-out table feature that extends over a child's lap, providing adequate ergonomic interaction and hours of safe, enjoyable play, and further provided with two legs which extend down to provide support for the activity table to make the case self-standing for use on any flat surface outside of the vehicle.

The activity case of the present invention has several structural features that are very important to the installation and function of the case inside the automobile, especially as there are many variations in seating design within the automotive industry. In addition, some seats are produced with an adjustable headrest and some have a solid seatback with no provision for headrest adjustment. Many Sport Utility Vehicles and Minivans have front seats with no headrest adjustment feature. The following design overview will describe how the activity case is designed to overcome these variables for optimal functionality in the vehicle.

An advantage of the present invention is that it is easily transported.

Another advantage of the present invention is that it provides safety features that would cause less injury should a person come in contact with the case during a collision.

One more advantage of the present invention is that it compensates for varying reclining seat angles.

Still another advantage of the present invention is that the front brace supporting the activity surface is angle to provide adequate leg room underneath.

An additional advantage of the present invention is that it can securely support itself on and perpendicular to a flat horizontal surface outside of the vehicle.

A contributory advantage of the present invention is that it may be used with a variety of seat backs.

Yet another advantage of the present invention is that the activity surface is positioned halfway up the case so that there is adequate leg room underneath for use in a vehicle and also to elevate the activity surface above the ground or a floor or a table surface when used outside of a vehicle.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings:

FIG. 1A is a front elevational diagrammatic view showing the T-shaped hook of the present invention hooked between the support posts of a vehicle seat headrest;

DETAILED DESCRIPTION OF THE INVENTION

In FIGS. 1-6, a transportable activity case device 20 is used for storing, transporting and using child activity materials 23 in conjunction with a convertible table surface 24 housed therein for use in vehicles or on tables, floors or other horizontal surfaces.

Figure 1:
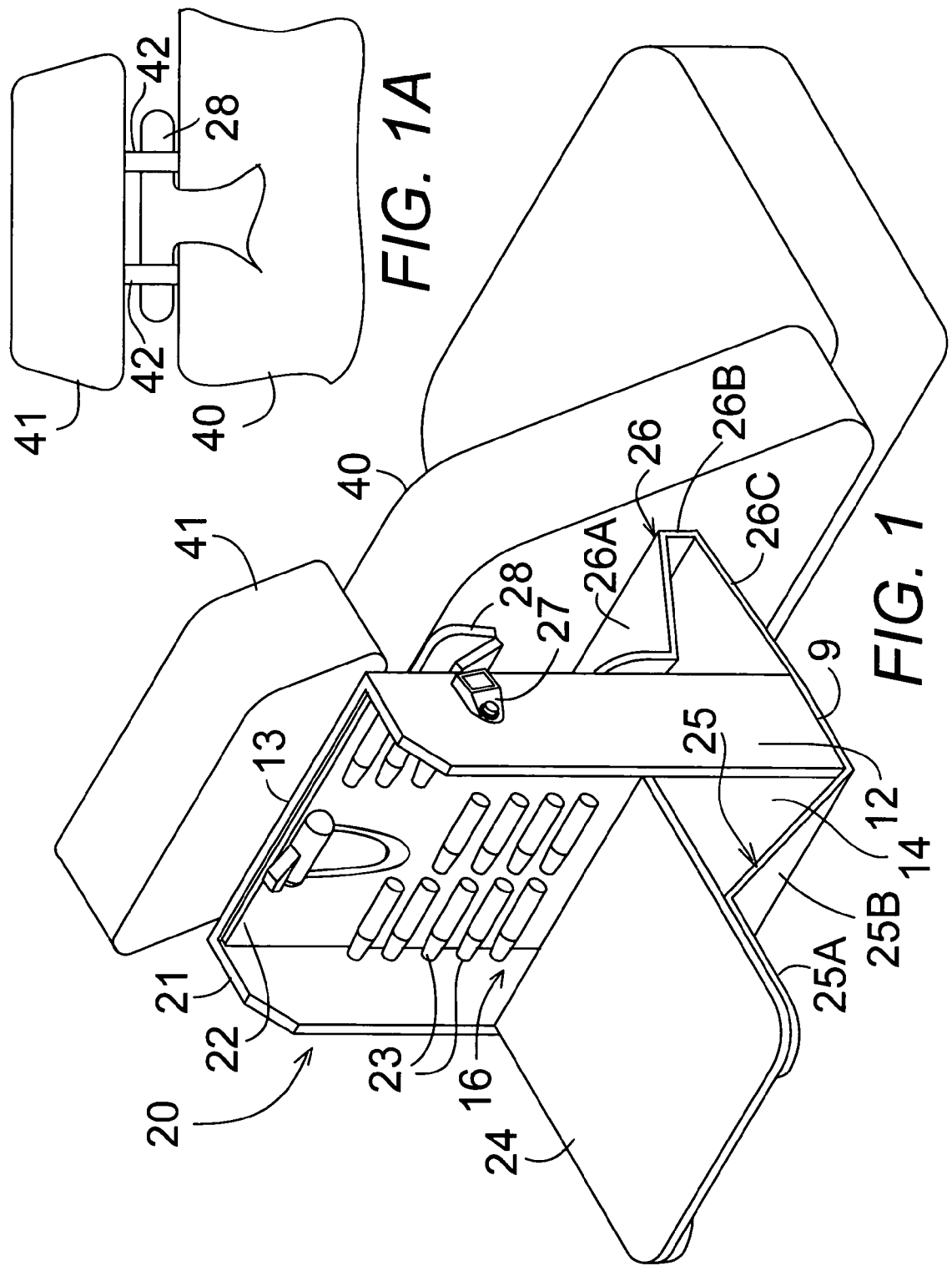
FIG. 1 is a perspective view of the transportable activity case mounted on the back of a front seat of a vehicle with the back brace out against the seat and the table surface out for use.
Figure 2:
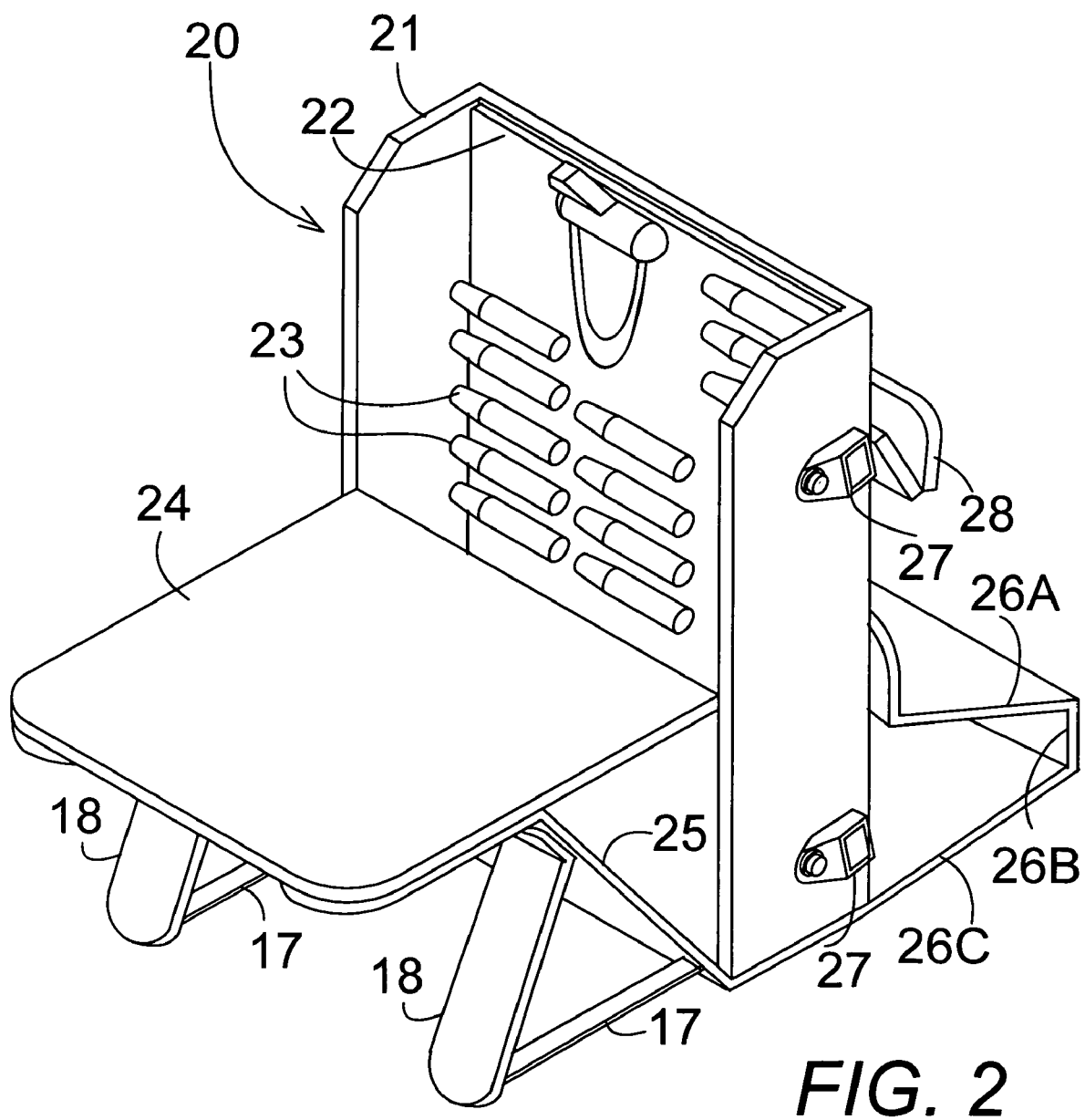
FIG. 2 is a perspective view of the transportable activity case resting on an external horizontal surface with the back brace out resting and the table surface support legs down on the external horizontal surface and the table surface out for use.
Figure 3:
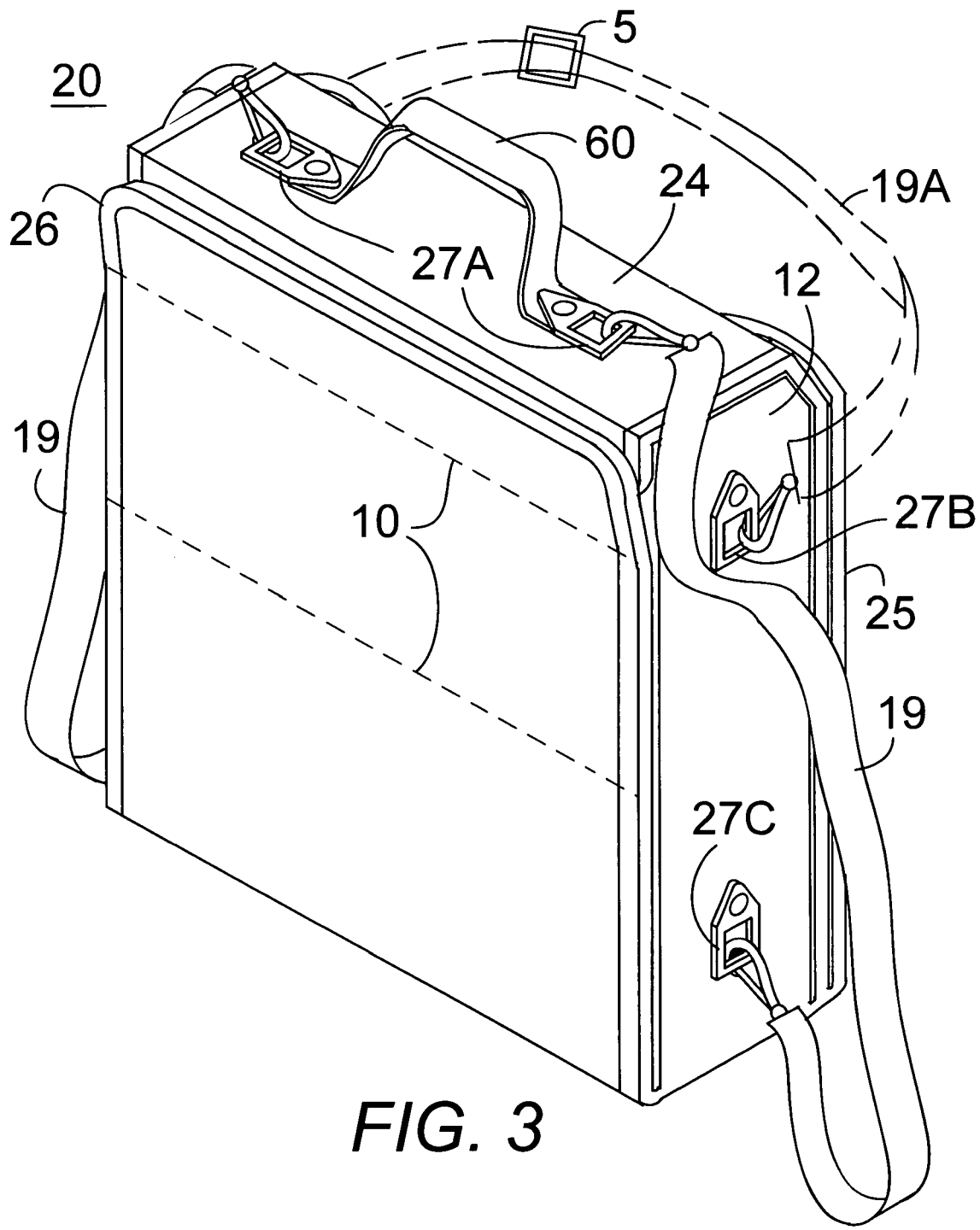
FIG. 3 is a perspective view of the transportable activity case of the present invention all closed up for transporting or storing.
Figure 4:
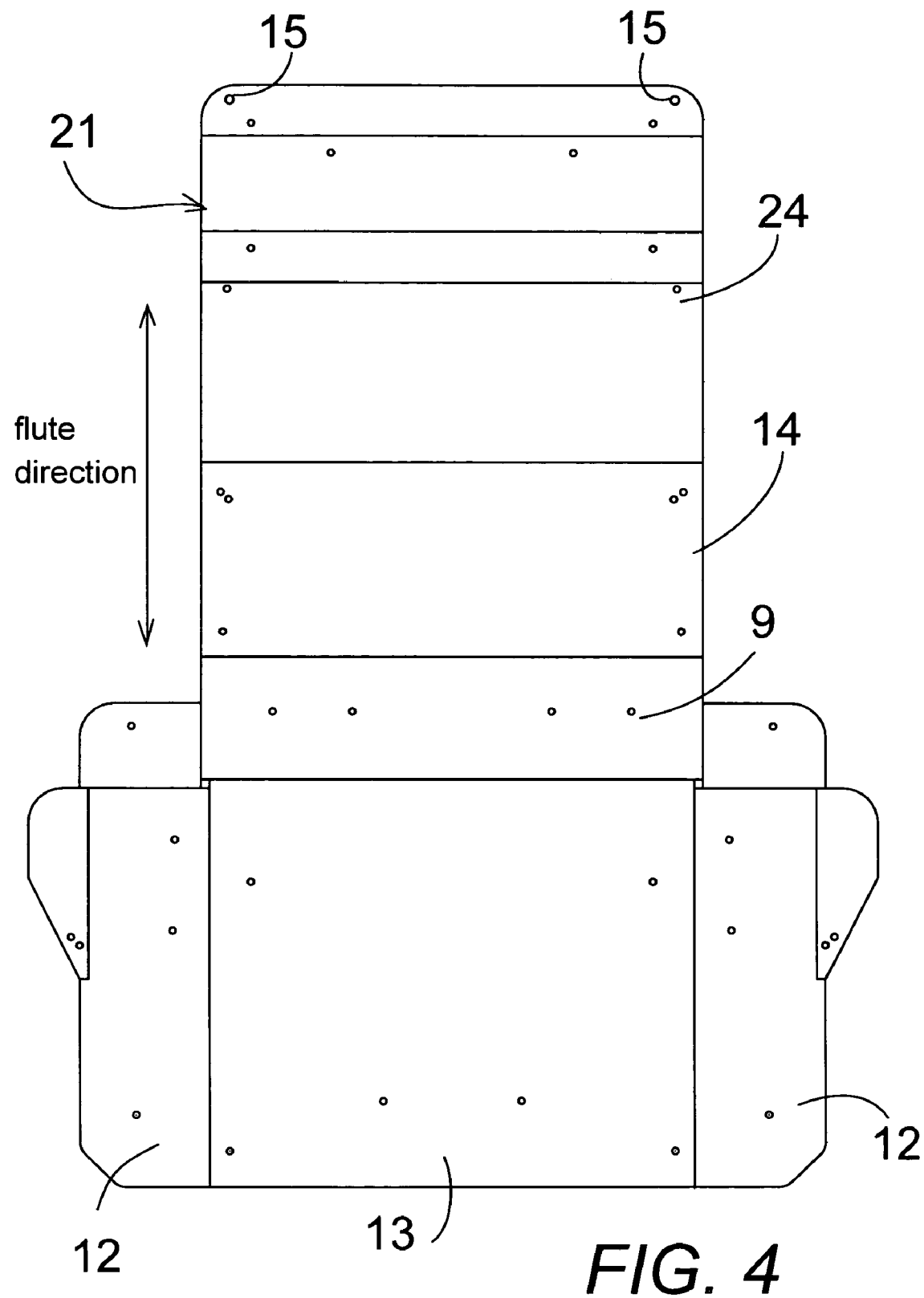
FIG. 4 is a plan view showing a cut out sheet of corrugated material used to construct the activity case structure of the present invention showing the partial cuts forming fold lines and living hinges.
Figure 5:
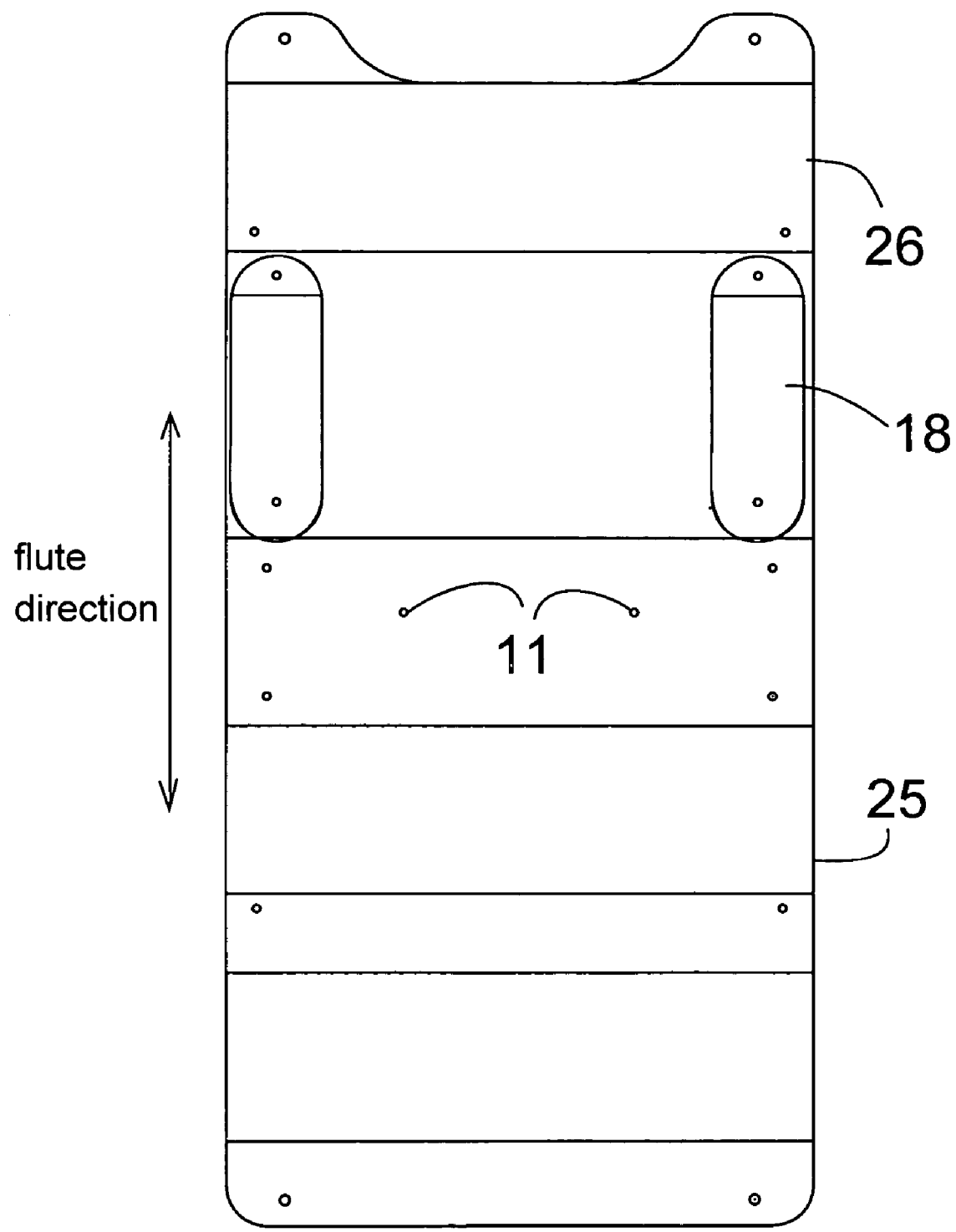
FIG. 5 is a plan view showing a cut out sheet of corrugated material used to construct the support braces of the present invention attached to the outside of the case showing the partial cuts forming fold lines and living hinges and the two cut outs of the table legs shown in position attached to the support braces corrugated sheet.

A rigid case 21 comprises a bottom 9, a front wall 14 and 24, a back wall 13 and two side walls 12 therebetween, all rigidly attached together to house an interior space 16. The rigid case 21 has a top opening for accessing the interior space 16 and a cover 24 closable over the top opening, as in FIG. 3. The cover 24 forms a top section of the front wall and is pivotally attached to a stationary bottom section 14 of the front wall. An outer front brace surface 25 is provided which is pivotally attached along the bottom 14 of the front wall. The front brace surface 25 is bendable into a top front brace section 25A and a bottom front brace section 25B so that the front brace surface 25 moves between a first position flat against the front wall 14 and 24 and attached thereto for transporting or storing the carrying case 21 with the cover closed 24 over the top opening, as shown in FIG. 3, and a second position with the bottom front brace section 25B pivoted at an angle away from the bottom section 14 of the front wall to leave adequate leg room under the supported table surface formed by the top surface of the cover 24 and the top front brace section 25A extending horizontally away from the case 21 and the cover 24 pivoted forward into a horizontal position with an outer end of the cover 24 attached to an outer end of the front brace surface 25A and the cover 24 resting on the horizontal top section of the front brace surface 25A, so that the outer front brace surface 25A supports the cover 24 and the cover 24 forms a supported table surface with the top portion of the front wall open for accessing the interior storage space 16, as shown in FIGS. 1 and 2.

The device 20 also comprises a T-shaped hook 28 or 28A pivotally attached to a top portion of the back wall 13 for engaging a head rest 41 on a front seat 40, as shown in FIG. 1A, to secure the case device 21 to the front seat 40. A means, such as mating hook and loop fasteners 50A and 50B or mating connectors 70 and 71, is provided for adjusting the T-shaped hook 28 or 28A to fit various vehicle front seat 40 heights while maintaining the table 24 height at an ergonomically efficient height for use by a child in a back seat.

Figure 6A:
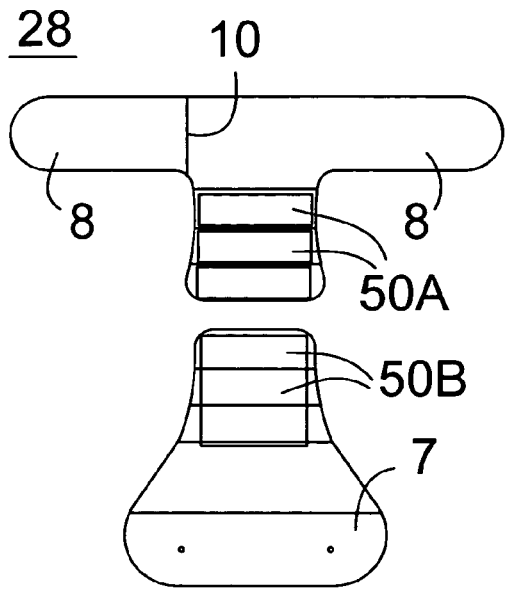
FIG. 6A is a plan view of a two-piece embodiment of the T-shaped hook of the present invention used to attach the case to a vehicle front seat headrest with the T-shaped hook portion aligned with the case attachment portion and showing the mating hook and loop fastener elements used to connect the two pieces and showing a bend line cut into one side of the T to allowing bending during insertion of the T between the vertical headrest supports.
Figure 6C:
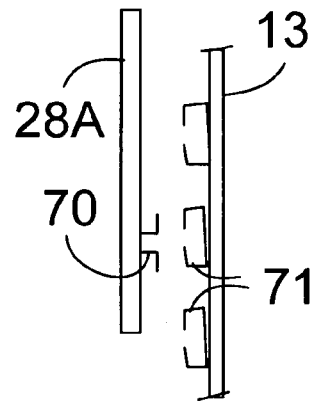
FIG. 6C is a side elevational view of a one-piece embodiment of the T-shaped hook of the present invention used to attach the case to a vehicle front seat headrest showing one side of a slide attachment element on the back of the hook and a series of mating slide attachment elements vertically spaced on the back of the case to allow selective height adjusted placement of the hook on the case.
Figure 6B:
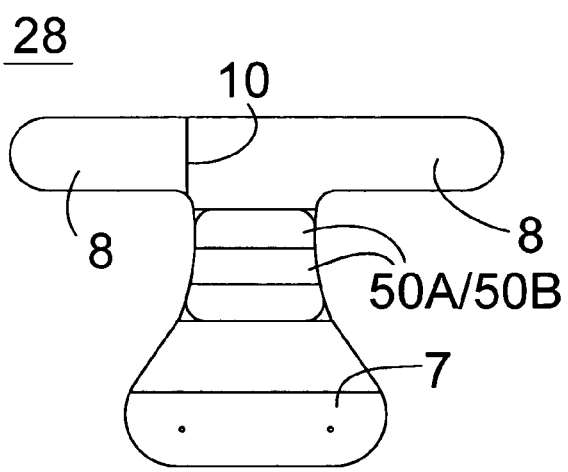
FIG. 6B is a plan view of a two-piece embodiment of the T-shaped hook of FIG. 6A with the two pieces joined together.

In FIGS. 6A and 6B, the T-shaped hook 28 comprises an attaching segment 7 that attaches to the back wall 13 and a hook segment 8 overlapping the attaching segment 7. The hook segment 8 is attachable to the attaching segment 7 by mating hook and loop fasteners 50A and 50B. The mating hook and loop fasteners 50A and 50B provide a means for attaching various components 7 and 8 of the device 20 together and also the means of adjusting the T-shaped hook 28 to fit various vehicle front seat 40 heights.

Figure 6D:
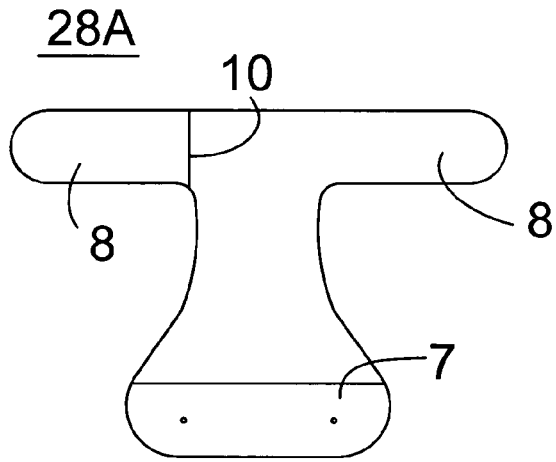
FIG. 6D is a front elevational view of the one-piece embodiment of the T-shaped hook of FIG. 6C showing a bend line cut into one side of the T to allowing bending during insertion of the T between the vertical headrest supports.

In FIGS. 6C and 6D, the T-shaped hook 28A comprises a single element having a T-shaped hook end 8 to hook through a pair of upright supports 42 of a headrest 41 on the front seat 40 and an attaching end 7. The means for adjusting the T-shaped hook 28A to fit various vehicle front seat 40 heights comprises a connector 70 on the attaching end 7, such as a sliding channel component attached thereto, and a series of mating connectors 71, such as spaced mating sliding channel components, attached in a vertical spaced array to the back wall 13.

The device 20 further comprises a back brace surface 26 pivotally attached to a bottom of the back wall 13. The back brace 26 surface is bendable into a top back brace section 26A and a bottom brace section 26B, as shown in FIG. 1. The back brace surface 26 is pivotable between a first position flat against the back wall 13 and attached thereto for transporting or storing the carrying case 21 with the cover 24 closed over the top opening, as in FIG. 3, and a second position with the bottom back brace section 26B pivoted at a right angle away from the bottom of the back wall 13 and the top back brace section 26A pivoted toward the back wall 13 and attached thereto to form a triangulated brace 26 for maintaining the case 21 in an upright position by keeping the bottom 9 of the case 21 away from the angled back of the front seat 40, as in FIG. 1. When the device 20 is closed, as in FIG. 3, the cover 24 may be secured by mating snaps 15, shown in FIG. 4, or alternately a hook and loop fastening system (not shown).

The device 20 further comprises a pair of table surface support legs 18 that may extend beneath the table surface 24. The table surface support legs 18 are provided with an attached support strap 17 for an alternative use of the table surface 24 with the bottom 9 of the case 21 and the back brace surface 26 resting on an external horizontal surface and the table surface support legs 18 engaging the external horizontal surface for stability, as shown in FIG. 2.

The walls and braces 9, 12, 13, 14, 22, 24, 25, 26, and 28 of the device 20 are fabricated from a corrugated plastic material having a series of partial cuts therethrough to form the hinged connections 10 and to enable bending to form intersecting walls and bottom for a lightweight sturdy structure. The corrugated material of the table surface 24 is covered with a smooth fabric material. The corrugated material is covered with a padded polyurethane foam coated material to add a soft cushion feel and further coated with a rugged weather resistant material on outside surfaces.

The device 20 also comprises one or more panels 22 having a front side and a back side, the front side of the panel(s) 22 supporting an array of child activity implements 23 removably attached thereto by means such as hook and loop fastening systems, snaps, elastic loops, adhesively attached hook and loop fastening patches, or other fastening means. The back side of the panel(s) 22 comprises a means of attaching the back side of the panel 22 to an interior of the back wall 13 to maintain the panel 22 in a vertical orientation for easy access to the child activity implements 23. Preferably, the means for attaching the back side of the panel 22 to an interior of the back wall 13 comprises the interior of the back wall 13 being covered with a material forming a loop side of a mating hook and loop fastener (not shown) and the back side of the panel(s) 22 to be covered with a piece of material bearing a mating hook portion of the mating hook and loop fastener. Alternately, the means for attaching the back side of the panel 22 to an interior of the back wall 13 may comprise hook and loop fastening systems, snaps, elastic loops, adhesively attached hook and loop fastening patches, or other fastening means.

The device 20 further comprises one or more loop means 27A, 27B, and 27C for attaching a strap to each of the side walls 12, as shown in FIG. 3, to attach a carrying strap 19 therebetween for use in transporting the device 20. An attaching strap 19A, adjustable in length is with a movable buckle 5, may be used to assist in securing the device 20 to the vehicle seat which has no headrest supports by tightening the attaching strap 19A around the seat.

In FIG. 3, a handle 60 on a top surface of the rigid case in the first position with the case closed is used in transporting the device by hand. A pair of straps 19 each attached between a metal or plastic loop 27A on each side of the handle 60 and a bottom side metal or plastic loop 27C on a side of the rigid case for carrying the device with the pair of straps 19 over the shoulders of a user in a backpack configuration. One of the straps 19 may alternately be attached between the two top side loops 27B for use as a shoulder strap in place of the attaching strap 19A or the attaching strap 19A used as a shoulder strap for carrying the case.

In practice, the activity case 20 is attached to the back side of a front seat 40 by a T-shaped hook 28 or 28A. The T-shaped hook 28 or 28A is pivotally attached to a top portion of the back wall 13 and engages the support posts 42 of a head rest 41 on the front seat 40, as shown in FIG. 1A. The T-shaped hook device 28 or 28A is made from corrugated plastic material and has a T-shaped hook end 8 with a living hinge 10 formed therein, as shown in FIGS. 6A-6D, which allows the user to bend a leg of the T-shaped hook end 8 to fit through the support posts 42 of the head rest 41, after which the T-shaped hook end 8 would be restored to its original flat position to provide support against the support posts 42 of the head rest 41. Mating hook and loop fasteners 50A and 50B, shown in FIGS. 6A and 6B or mating connectors 70 and 71, shown in FIGS. 6C and 6D, are employed to adjust the T-shaped hook 28 or 28A to fit various vehicle front seat 40 heights while maintaining the table 24 height at an ergonomically efficient height for use by a child in a back seat.

Most front seats 40 in automobiles recline at varying angles to provide the drivers and passengers with proper comfort. This seat angle can have a negative effect on the activity case 20 and backseat user as it hangs from the front seat 40. To compensate for varying seat 40 angles, the activity case 20 is provided with a hinged panel 26 located on the backside of the case 21 near the bottom. When the panel 26 is detached from the outer side of the back wall 13 and slid downward, the two hinges in the middle of the panel 26 bend so that with a bottom section 26C bent away from the rigid case and a top section 26C bent back toward the rigid case, a small vertical seat contacting section 26B is formed between the top and bottom sections 26A and 26C and with a top of the top section 26A secured to the rigid case, the three sections 26A, 26B, and 26C extend back away from the back panel 13 to create a brace 26, as in FIGS. 1 and 2. This brace 26 will push against the seatback 40 and allow the case 21 to maintain a position perpendicular to the floor of the vehicle, as in FIG. 1.

The front of the case 21 consists of two panels, the outer panel 25 used as a brace, and the inner panel 24 that acts as the table surface when deployed, as in FIGS. 1 and 2. The table panel 24 also acts as an enclosure when the attachment panel 28 is being used to secure the case 21 to the headrest 41. The lid 24 is secured to the top of the case 21 by metal snap fasteners 15, or alternately hook and loop fasteners (not shown), so it may be stowed when not in use, thereby covering the top of the case 21 and preventing items from falling out during travel.

The fold-out table 24 is pulled forward toward the user after being released from the snap fasteners 15, or alternately hook and loop fasteners (not shown), and aligned with the mating snap fasteners 15 on the brace panel 25. This alignment should produce a level surface and enough strength to support normal pressure exerted by a child when writing.

To use the portable activity case 20 outside of a vehicle on a horizontal surface such as a table or a floor, a pair of table surface support legs 18 are extended beneath the table surface 24. The table surface support legs 18 are provided with an attached support strap 17, which prevent the legs 18 from being over extended. The bottom 9 and the back brace surface 26 rest on the external horizontal surface and the table surface support legs 18 engage the external horizontal surface to provide further stability and to hold the case 20 perpendicular to the horizontal surface, as shown in FIG. 2.

The case 21 is preferably made of plastic corrugated material, which is strong, flexible, lightweight, and can be fabricated so that "living" hinges 10 may be produced in virtually any area of the material. The plastic corrugated material has a similar design to cardboard, where there is an upper and lower layer of plastic film with vertical "flutes" positioned vertically between the two layers to provide strength. The plastic corrugated can be scored partially through the top layer and flutes, preferably cut across the direction of the flutes, which flute direction is indicated by the two headed arrow of FIGS. 4 and 5, allowing only the lower layer of plastic to remain and act as the living hinge 10 when flexed. This hinge 10 will only flex 180 degrees.

Living hinges 10 are used in the case 21 as normal usage requires various sections 24, 25, 26, and 28 to open and close many times without the need for attaching a pre-fabricated hinge in these areas. The plastic corrugated material is preferably produced with 100% Polypropylene which provides a strong hinge 10, actually providing greater strength over time. This material will also flex when it is subjected to high loads, providing excellent safety features if a person comes in contact with the activity case 20 during a collision. The material bends and does not shatter or produce any sharp edges to could cause harm.

To produce a soft surface for the portable activity case 20, several fabric types (polyester knit, nylon, etc.) will be used to cover the entire surface of the plastic corrugated material. The fabric will be laminated with polyurethane foam, approximately 0.125" thick to add a "cushion-like" feel.

Both inside and outside surfaces of the activity case 20 may be covered with foam (polyurethane) laminated polyester knit and suede materials. Preferably, a special VELCRO compatible material is used on the front surface of the activity implement support panel(s) 22 to allow the use of mating VELCRO products (not shown) which hold various child activity implements 23 or accessory trays (not shown) filled with markers and crayons 23. Any fabric material that meets the Federal Motor Vehicle Safety Standard 302 (Flammability) can be used. Alternately, the various child activity implements 23 or accessory trays (not shown) filled with markers and crayons 23 may be held in place by means such as hook and loop fastening systems, snaps, elastic loops, adhesively attached hook and loop fastening patches, or other fastening means.

During manufacturing, the case 21 may be die-cut from plastic corrugated material sheet stock to the size required for each panel component 9, 12, 13, 14, 22, 24, 25, 26, and 28. The living hinges 10 will be scored in the die cutting operation as will other folded (non-hinge) sections. Once the panels 9, 12, 13, 14, 22, 24, 25, 26, and 28 are cut, a 3M spray adhesive is used to join the fabric to the plastic corrugated material. A fabric binder (edging) is then sewn around the perimeter of the cut parts with needle piercing completely through the 6 mm plastic. Metal industrial snap fasteners 15 are then crimped on the parts at various locations. Each section is then assembled together with a combination of rivets and screws 11 to achieve the final configuration.

Preferably, the case 21 is approximately 14 inches wide, 14 inches tall and 3.5 inches deep. The table 24 extends approximately 11 inches and is approximately 14 inches wide.

It is understood that the preceding description is given merely by way of illustration and not in limitation of the invention and that various modifications may be made thereto without departing from the spirit of the invention as claimed.

What is claimed is:

1. A transportable activity case device for storing, transporting and using child activity materials in conjunction with a convertible table surface housed therein, the device comprising:

a rigid case comprising a bottom, a front wall, a back wall and two side walls therebetween, all rigidly attached together to house an interior space, a top opening for accessing the interior space and a cover closable over the top opening, the cover forming a top section of the front wall pivotally attached to a stationary bottom section of the front wall, an outer front brace surface pivotally attached along a bottom of the front wall, the front brace surface bendable into a top front brace section and a bottom front brace section so that the front brace surface moves between a first position flat against the front wall and attached thereto for transporting or storing the carrying case with the cover closed over the top opening and a second position with the bottom front brace section pivoted at an angle away from the bottom section of the front wall and the top front brace section extending horizontally away from the case and the cover pivoted forward into a horizontal position with an outer end of the cover attached to an outer end of the front brace surface and the cover resting on the horizontal top section of the front brace surface, so that the outer front brace surface supports the cover and the cover forms a supported table surface with a top portion of the front wall open for accessing the interior storage space;

a T-shaped hook pivotally attached to a top portion of the back wall for engaging a head rest on a front seat to secure the case device to the front seat, a means for adjusting the T-shaped hook to fit various vehicle front seat heights while maintaining the table height at an ergonomically efficient height for use by a child in a back seat;

a back brace surface pivotally attached to a bottom of the back wall, the back brace surface bendable into a top back brace section, a seat contacting section, and a bottom brace section, the back brace surface pivotable between a first position flat against the back wall and attached thereto for transporting or storing the carrying case with the cover closed over the top opening and a second position with the bottom back brace section pivoted at a right angle away from the bottom of the back wall, the seat contacting section vertical, and the top back brace section pivoted toward the back wall and attached thereto to form a back brace for maintaining the case in an upright position by keeping the bottom of the case away from the angled back of the front seat of the vehicle;

a pair of table surface support legs extendable beneath the table surface for alternative use of the table surface with the case and the back brace surface resting on an external horizontal surface and the table surface support legs engaging the external horizontal surface.

2. The device of claim 1 further comprising at least one panel having a front side and a back side, the at least one panel supporting an array of child activity implements removably attached thereto on a front side and a means of attaching the back side of the at least one panel to an interior of the back wall to maintain the at least one panel in a vertical orientation for easy access to the child activity implements.

3. The device of claim 2 wherein the walls and braces are fabricated from a corrugated material having a series of partial cuts therethrough cut across a series of flutes of the corrugated material to form the hinged connections and to enable bending to form intersecting walls and bottom for a lightweight sturdy structure and the inside surfaces of the corrugated material are covered with a material forming a loop side of a mating hook and loop fastener and the means of attaching the back side of the at least one panel to an interior of the back wall comprises at least one piece of material bearing a mating hook portion of the mating hook and loop fastener.

4. The device of claim 1 further comprising at least one means for attaching a strap to each of the side walls to attach a carrying strap therebetween for use in transporting the device.

5. The device of claim 1 further comprising a handle on a top surface of the rigid case in the first position with the case closed for use in transporting the device.

6. The device of claim 5 further comprising a pair of straps each attached between the handle and a bottom side of the rigid case for carrying the device with the pair of straps over the shoulders of a user in a backpack configuration.

7. The device of claim 1 further comprising an attaching strap attached between two sides of the rigid case adjacent to a top of the rigid case, the strap being adjustable in length for use in tightening the strap around a front seat of a vehicle with no headrest support posts for securing the device to the front seat of the vehicle.

8. The device of claim 1 wherein the T-shaped hook comprises an attaching segment attached to the back wall and a hook segment overlapping the attaching segment, the hook segment attachable to the attaching segment by mating hook and loop fasteners as the means for adjusting the T-shaped hook to fit various vehicle front seat heights.

9. The device of claim 1 wherein the T-shaped hook comprises a single element having a T-shaped hook end to hook through a pair of upright supports of a headrest on the front seat and an attaching end having a connector attached thereto and a series of mating connectors attached in a vertical spaced array to the back wall as the means for adjusting the T-shaped hook to fit various vehicle front seat heights.

10. The device of claim 1 wherein the walls and braces are fabricated from a corrugated material having a series of partial cuts therethrough cut across a series of flutes of the corrugated material to form the hinged connections and to enable bending to form intersecting walls and bottom for a lightweight sturdy structure.

11. The device of claim 10 wherein the corrugated material is a corrugated plastic material.

12. The device of claim 10 wherein the corrugated material is covered with a smooth fabric material at least over the table surface.

13. The device of claim 10 wherein the corrugated material is covered with a rugged weather resistant material on outside surfaces.

14. The device of claim 10 wherein the corrugated material is covered with a padded material to add a soft cushion feel.

15. The device of claim 14 wherein the padded material comprises a polyurethane foam coated material.

16. The device of claim 1 wherein a means of attaching various components of the device together comprise mating snaps.

17. The device of claim 1 wherein a means of attaching various components of the device together comprise mating hook and loop fasteners.

* * * * *